United States Patent [19]

Ljungström

[11] 4,329,116
[45] May 11, 1982

[54] WIND TURBINE OF CROSS-FLOW TYPE

[76] Inventor: Olle Ljungström, Sälgstigen 12, S-181 62 Lidingö, Sweden

[21] Appl. No.: 82,154

[22] Filed: Oct. 5, 1979

[30] Foreign Application Priority Data

Oct. 6, 1978 [SE] Sweden .............................. 7810504

[51] Int. Cl.³ .............................................. F03D 3/06
[52] U.S. Cl. .................. 416/19; 416/132 B; 416/227 A
[58] Field of Search .......... 416/227 A, 197 A, 132 B, 416/119, 19, 240 A, 196 A

[56] References Cited

U.S. PATENT DOCUMENTS

| 1,820,529 | 8/1931 | Darrieus | 416/196 A |
|---|---|---|---|
| 1,835,018 | 12/1931 | Darrieus | 416/119 |
| 2,344,266 | 3/1944 | Reissner | 416/228 R X |
| 3,918,839 | 11/1975 | Blackwell et al. | 416/240 A X |
| 4,081,221 | 3/1978 | Andrews | 416/227 A |
| 4,115,032 | 9/1978 | Lange | 416/197 A |
| 4,130,380 | 12/1978 | Kaiser | 416/197 A |
| 4,142,822 | 3/1979 | Herbert | 416/23 X |
| 4,151,424 | 4/1979 | Bailey | 416/111 X |
| 4,264,279 | 4/1981 | Dereng | 416/227 A |

FOREIGN PATENT DOCUMENTS

| 539171 | 6/1922 | France | 416/119 |
|---|---|---|---|
| 2298707 | 8/1976 | France | 416/227 A |
| 403889 | 1/1934 | United Kingdom | 416/119 |

*Primary Examiner*—Everette A. Powell, Jr.
*Attorney, Agent, or Firm*—Eric Y. Munson

[57] ABSTRACT

Wind turbine of cross-flow type with constant or cyclically adjustable blade angle. The vanes (2) consist of one or more sets of blades with arched or, in sections, straight extension in longitudinal direction, comprising several substantially parallelly extending blades (3, 4 8), the spacing of which from one another is fixed by means of a number of spacing elements (5, 9) having aerodynamic profiling and providing a spacing of the order of magnitude of between ½ and 3 times the blade chord.

9 Claims, 12 Drawing Figures

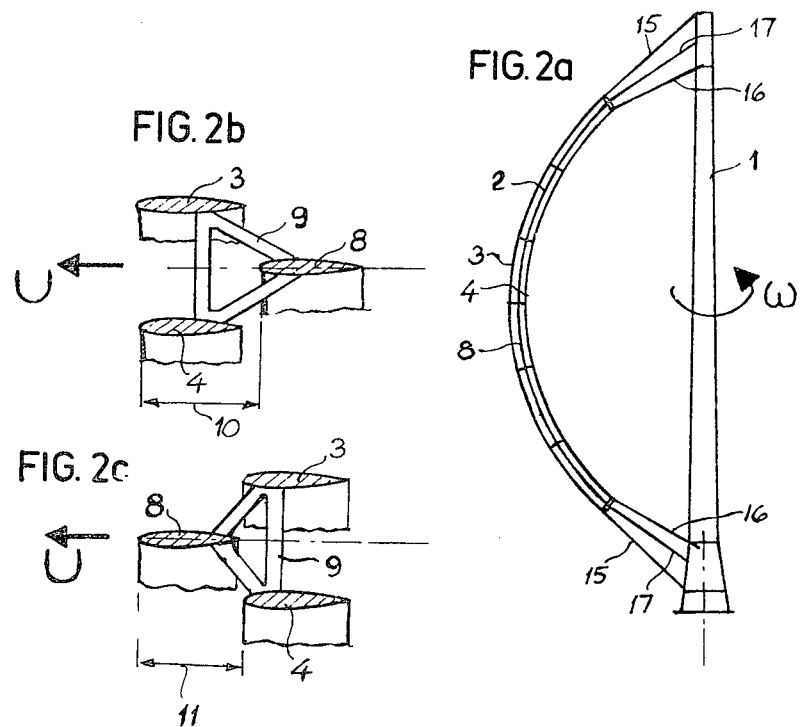
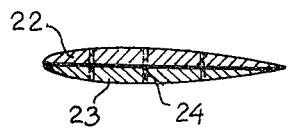
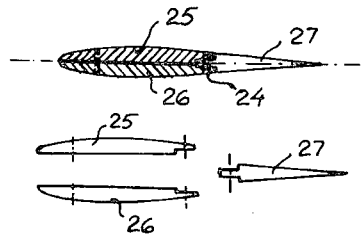

FIG. 3c
FIG. 3b
FIG. 3a
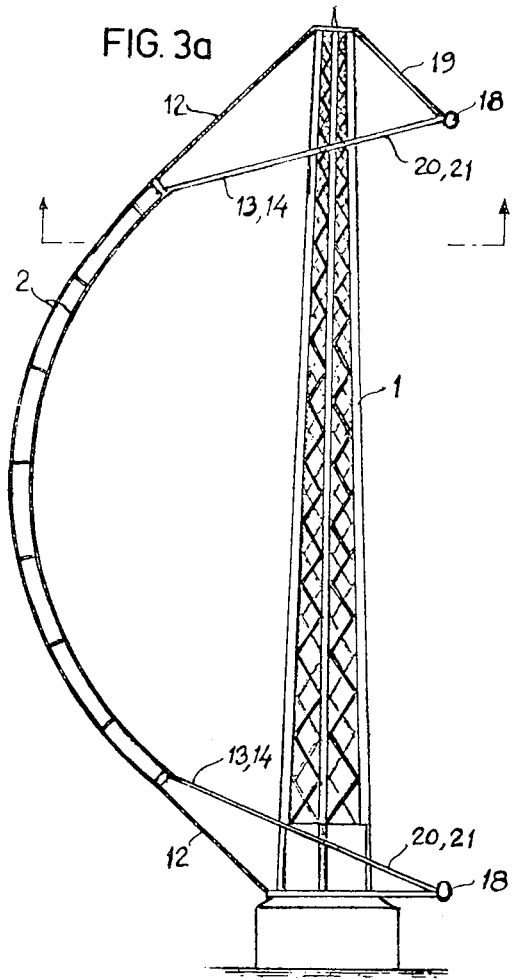
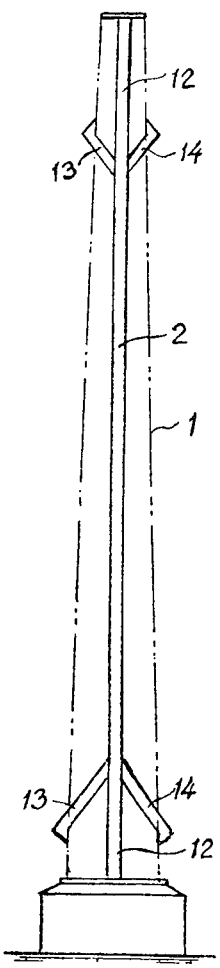
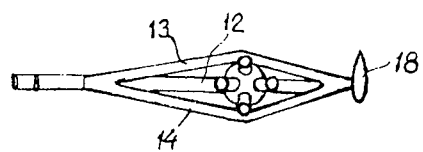

WIND TURBINE OF CROSS-FLOW TYPE

The present invention relates to a wind turbine of cross-flow type with fixed vane angle or in known manner cyclically adjustable vane angle, and the object of the invention is to improve such a wind turbine so as to augment the capacity of the vanes of absorbing load in order firstly to obtain increase of efficiency when operated at high wind velocities and in gusts (region of risk of blade stalling) and secondly to protect the vanes with stopped turbine with inoperative vanes in hurricane wind (risk of breaking of vanes by denting). This object is attained by the wind turbine according to the invention having been given the characteristic features stated in the subsequent claims.

The invention will be described nearer hereinbelow in connection with the accompanying drawings.

FIG. 1a shows a side view of a wind turbine according to the invention, whereas

FIG. 2a shows a side view of an embodiment with triple vanes, FIGS. 2b and 2c showing cross-sections through different shapes of vanes.

FIG. 3a shows a side view, 3b an end view and 3c a plan of a wind turbine according to the invention with balance weights.

FIGS. 4 and 5 show cross sections through turbine vanes.

Figure 1B:
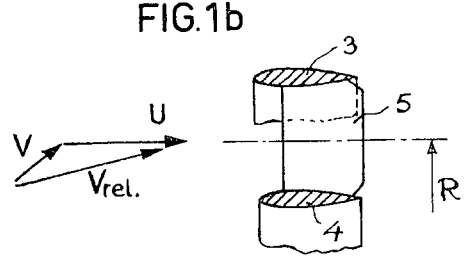
FIGS. 1b–1d show cross-sections through three different shapes of vanes.
Figure 1A:
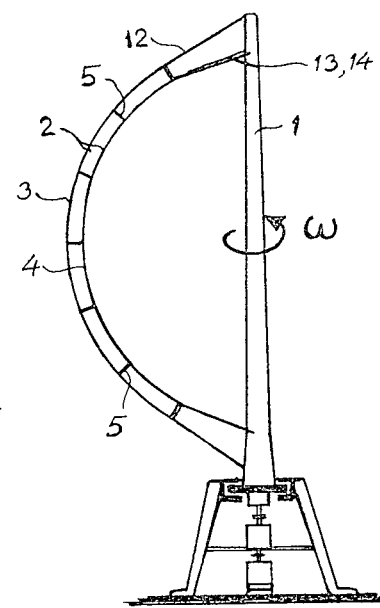
Figure 1C:
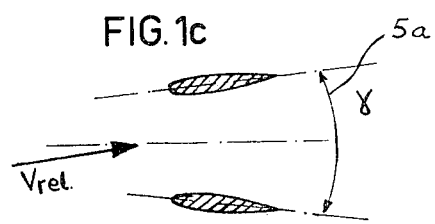
Figure 1D:
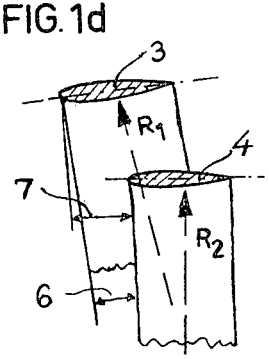

In the embodiment of FIG. 1a a rotatable rotor shaft 1 is mounted in conventional manner on a stand not denoted specifically with a reference numeral. At least one arched vane which can be formed from a plurality of joined straight sections extending in a longitudinal direction is arranged rotatably with our about the rotor shaft. The vane or set of blades 2 is, according to the invention, subdivided into a plurality of substantially parallelly extending blades 3, 4 the spacing of which from one another is fixed by means of a number of spacing elements 5 having an aerodynamic profile and providing a spacing of the order of magnitude of ½ to 3 times the blade chord. Examples of various blade types are shown in FIGS. 1b–1c, it being possible also to arrange the blades in each vane with a minor angular displacement 5a between the chord planes, as is shown in FIG. 1c. FIG. 1d shows how the blades have been imparted a displacement 7 also in the direction of the chords. In the embodiment shown in FIG. 1a, the securing of the vanes onto the tower or rotor shaft 1 is effected by means of several radial braces or strays, in the illustrated case three such braces 12, 13, 14.

FIG. 2 shows an arrangement similar to that shown in FIG. 1 with a rotor shaft 1 and a vane or set of blades 2 rotating about said shaft and secured to the rotor shaft 1 by several braces 15, 16, 17. The set of blades 2 consists in the embodiment of FIG. 2a of three blades 3, 4, 8 which are shown in FIGS. 2b and 2c. In FIG. 2b, reference numeral 9 denotes the spacing element for fixing the blades, and the blades have been given also a displacement 10 in the direction of the chord. This displacement has been denoted 11 in FIG. 2c.

The shape shown in FIGS. 1 and 2 of the wind turbine vanes according to the invention results in an improvement of the load absorption by the set of blades, both when in operation in strong wind and in gusts and also when the turbine is stopped with inoperative blades in a hurricane. The specific embodiments with angular differences between the blades and/or a displacement in the chord direction renders possible to trim the blades to the best possible gliding ratio (L/D ratio) within a large range of wash in, minimum drag and high dynamic rising and therewith high driving power component for the biplane vane, the triplane vane, as well as an additional improvement of the load absorption by the set of blades when exposed to high wind velocities (low numbers of revolutions of the turbine) and on strong gusts, while at the same time avoiding stalling and thereby improving the transfer of power to the turbine shaft.

The arrangements of biplanes and triplanes with spacing elements are suited for a predetermined total blade area of the turbine to reduce the exposed blade surface which acts as load on the set of blades when the turbine has been stopped during a hurricane, as well as by the spacing braces substantially to reduce the risk of buckling of blades in a hurricane, thereby rendering possible considerably to reduce the total weight of the vane or set of blades. The securing of the blades onto the tower which is designed to be effected with three or more radial braces in both upward and downward directions such as the braces 12, 13, 14 and 15, 16, 17, may be devised as a rigid lattice work. As is evident from FIG. 3, the set of blades 2 which by means of the braces 12, 13, 14 is secured to the tower 1 can be balanced by balance weights 18 suspended on brackets 19, 20, 21. The set of blades may also in known manner be devised for function as pendulum and equipped with dampers and springs, as, for example, shown in the co-pending patent application filed concurrently herewith by the same applicant (Swedish patent application Ser. No. 7810504-6 filed Oct. 6, 1978.)

FIG. 4 shows that each blade 3, 4, 8 in a set of blades 2 can be subdivided into two segments 22, 23 which at the outset had been manufactured straight with constant cross-section and were joined together to curved vane shape in the mounting operation and held together by assembling elements 24. In FIG. 5 the blade is composed of three segments having constant cross section and denoted 25, 26, 27, which in the same manner have been assembled to curved vane shape when joined together to the final shape of the set of blades. Of course, the vane may also be composed of more segments than three.

It is obvious that the shown and described embodiments are examples only of realisation of the inventive idea and that the same can be varied within the scope of the subsequent claims.

I claim:

1. In a wind turbine of the cross flow type having at least one vane mounted at upper and lower ends thereof to a rotor shaft for peripheral rotation with or about said rotor shaft, the improvement comprising:
said at least one vane being continuously curved relative to said rotor shaft between the ends of said at least one vane mounted to said rotor shaft, and said at least one vane comprising a plurality of substantially parallel blades extending in a longitudinal direction along the entire length of the vane, and
a plurality of spacing elements mounted to and disposed between said plurality of blades for spacing said plurality of blades apart from each other, said spacing elements being of a sufficient size to provide a spacing between said plurality of blades of the order of magnitude of ½ to 3 times the blade chord.

2. A wind turbine as claimed in claim 1 wherein said at least one vane is formed from a plurality of interconnected joined segments.

3. A wind turbine as claimed in claim 2 wherein said vane is formed from two joined segments, each of said segments being straight and having a constant cross sectional area, and assembling elements for connecting said joined segments together in a curved shape.

4. A wind turbine as claimed in claim 2, wherein said vane is formed from at least three joined segments, each of said segments being straight and having a constant cross sectional area, and assembling elements disposed between adjacent abutting ends of said joined segments for connecting said joined segments together in a curved shape.

5. A wind turbine as claimed in claim 1 further including at least three radial braces mounted to both the upper and lower ends of said vane for securing said vane to said rotor shaft.

6. A wind turbine as claimed in claim 5 further including balance weights connected to the upper and lower ends of said vane by brackets coupled to the ends of said vane.

7. A wind turbine as claimed in claims 1 or 2 in which each of said plurality of blades comprising said vane are arranged to define a minor angular displacement between the chord planes.

8. A wind turbine as claimed in claim 1 wherein said at least one vane is formed from at least two of said substantially parallel extending blades.

9. A wind turbine as claimed in claim 1 wherein said at least one vane is formed from at least three of said substantially parallel extending blades.

* * * * *